United States Patent [19]
Hunter

[11] Patent Number: 5,772,114
[45] Date of Patent: Jun. 30, 1998

[54] INDIVIDUALLY CONTROLLED NOZZLE VALVE SYSTEM FOR APPLICATION OF LIQUID FERTILIZER/CHEMICALS

[76] Inventor: Paul Hunter, 3133 Willow, American Falls, Id. 83211

[21] Appl. No.: 647,204

[22] Filed: May 9, 1996

[51] Int. Cl.⁶ ................................................. A01G 27/00
[52] U.S. Cl. ............................................. 239/67; 239/170
[58] Field of Search .............................. 239/67, 69, 163, 239/170, 172, 726, 727, 728

[56] References Cited

U.S. PATENT DOCUMENTS

| | | | |
|---|---|---|---|
| 4,260,107 | 4/1981 | Jackson | 239/74 |
| 4,738,400 | 4/1988 | Irwin | 239/536 |
| 4,817,870 | 4/1989 | Dalton | 239/170 X |
| 4,960,242 | 10/1990 | Larson | 239/170 X |
| 5,048,755 | 9/1991 | Dodds | 239/69 X |
| 5,154,349 | 10/1992 | Vaughn | 239/69 |
| 5,246,164 | 9/1993 | McCann et al. | 239/73 X |
| 5,333,785 | 8/1994 | Dodds et al. | 239/69 |
| 5,337,959 | 8/1994 | Boyd | 239/69 X |

FOREIGN PATENT DOCUMENTS 3716349 11/1988 Germany ................................. 239/69

*Primary Examiner*—Andres Kashnikow
*Assistant Examiner*—Steven J. Ganey
*Attorney, Agent, or Firm*—Hopkins Roden Crockett Hansen & Hoopes, PLLC

[57] ABSTRACT

A system for applying fluid to a ground surface, the system includes (a) a plurality of nozzle valves, (b) a control switch and open and close manifold valves for operating each nozzle valve so that each nozzle valve closes essentially concurrently, and (c) a pair of switching manifolds have for operating each nozzle valve so that each nozzle valve is, selectively, opened or closed independently of each other nozzle valve, provided the opened and close valves have not closed the nozzle valves.

24 Claims, 4 Drawing Sheets

INDIVIDUALLY CONTROLLED NOZZLE VALVE SYSTEM FOR APPLICATION OF LIQUID FERTILIZER/CHEMICALS

TECHNICAL FIELD

This invention relates to farming technology and, more particularly, to a system for applying liquids fertilizers and chemicals using individually controlled valves for each application nozzle and a master control for closing all the valves.

BACKGROUND OF THE INVENTION

Current systems for delivering liquid fertilizers and chemicals (referred to hereafter as fluid) to fields provide a single boom or multiple booms attached to a driver's cab or trailer. Each boom has at least one application nozzle through which fluid is sprayed onto the field. The booms each have main valves which when closed prevent the flow of the fluid to the nozzles and when open allow the fluid to flow to the nozzles. Additionally, some systems have individual valves which control the flow of fluid to each nozzle. Some of these systems control the individual valves independently and other of these systems control the individual valves as a group (i.e., either all opened or all closed). However, none of these systems allow the individual valves to be controlled independently at times and as a group at other times.

Furthermore, these individual valves are typically either air actuated diaphragm, electric solenoid, or electric motor valves. These types of valves present several problems.

Referring first to the electric solenoid valves, these types of valves are usually not large enough to allow sufficient flow for delivering fluid at high rates of volume, for example, 100 gallons per acre at 12 miles per hour. Electric solenoid valves also do not close properly when used with suspension fertilizer because undissolved particles in the fluid remain in the valve preventing the valves from completely closing. Additionally, electric solenoid valves tend to fail rapidly when used with corrosive material.

Now referring to electric motor valves, these types of valves are very expensive when compared to other types of valves. Electric motor valves are also significantly larger and heavier than other types of valves. The size of the electric motor valve makes it difficult to mount several of them on a boom. With the weight of several electric motor valves bearing on a boom, the boom is likely to break in rough field conditions. Rough field conditions cause the boom to bounce which amplifies the forces which the electric motor valves exert on the boom. The amplified forces are often large enough to break the boom.

One problem with air diaphragm valves is that they are typically "normally open" (i.e., they open when they are not being forced shut) so they only remain closed as long as air pressure is applied to close the valve. When the engine is turned off, such as when spraying is complete, the air supply is also turned off. With the air supply turned off, eventually enough air will leak out of the lines to allow the valves to open, potentially spilling fluid. Another problem with the diaphragm valves is that the diaphragms will deteriorate under normal use and will deteriorate rapidly when corrosive fluids (typical of many types of chemicals sprayed in fields) pass through the valves. As a result, the fluid backs up into the air lines. The fluid in the air lines may not only harm the pneumatic system but, additionally, the fluid could back all the way up to the valve control switches located in the cab, and leak into the cab. A leak into the cab could be potentially life threatening if the fluid is hazardous to humans.

Accordingly, objects of the present invention are to provide an improved fertilizer/chemical delivery system which has a master control to close all nozzle valves, but allows the nozzle valves to operate individually when the master control has not closed the nozzle valves.

SUMMARY OF THE INVENTION

According to principles of the present invention in a preferred embodiment, a system for applying fluid to a ground surface comprises (a) a plurality of nozzle valves, (b) first control means for operating each nozzle valve so that each nozzle valve closes essentially concurrently, and (c) second control means for operating each nozzle valve so that each nozzle valve is, selectively, opened or closed independently of each other nozzle valve, provided the first control means has not closed the nozzle valves. According to further principles of the present invention, a preferred embodiment further includes (a) a main valve, (b) the first control means further operating the main valve so that the main valve closes essentially concurrently with the nozzle valves, and (c) piping means for directing the fluid, the piping means communicating with the main valve and each nozzle valve, wherein the fluid is directed first to the main valve, then, if the main valve is open, through the main valve, then to each of the nozzle valves, then through each nozzle valve which is open.

Other objects, advantages, and capabilities of the present invention will become more apparent as the description proceeds.

DETAILED DESCRIPTION OF THE INVENTION

Figure 1:
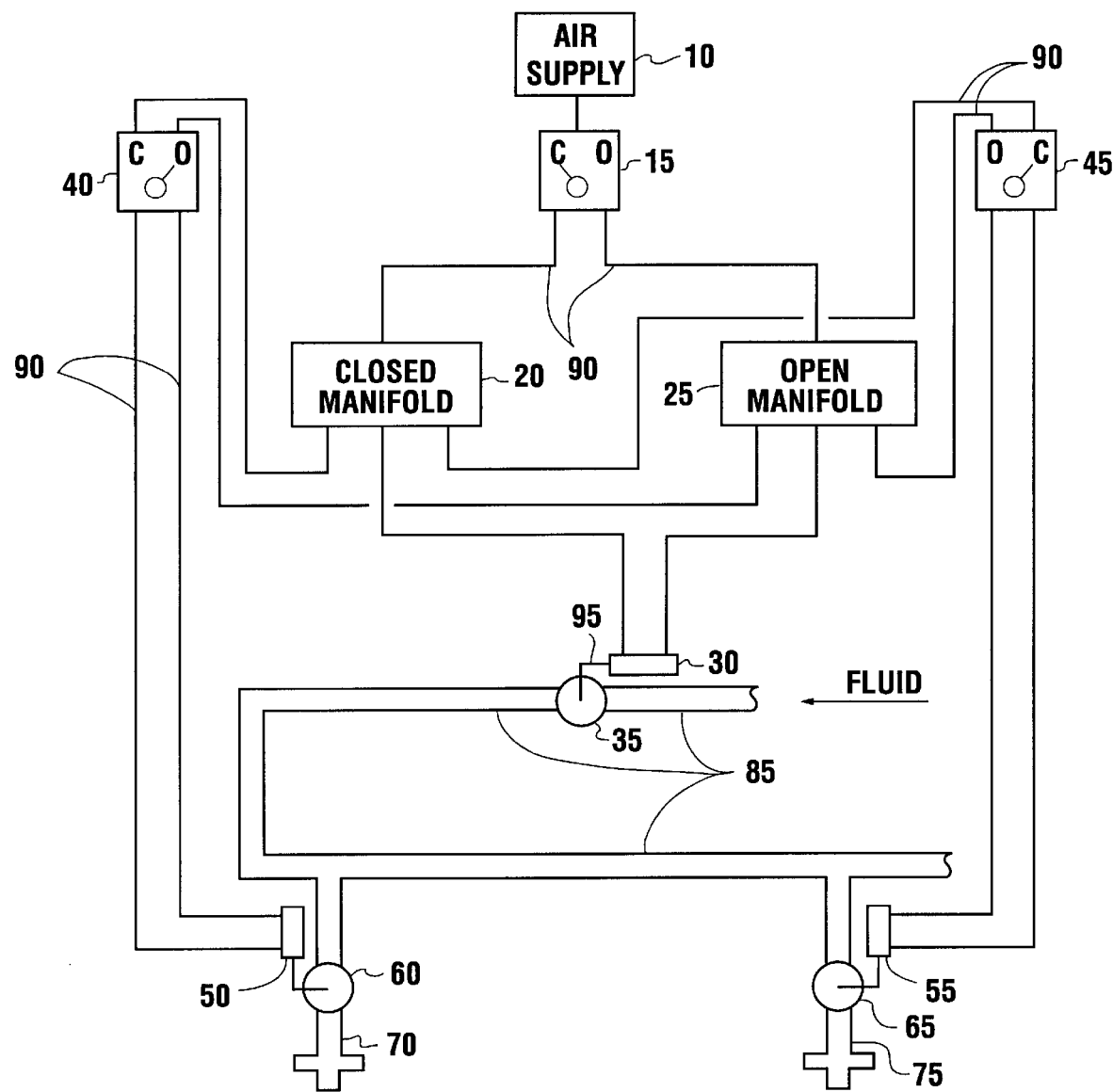
FIG. 1 is a block diagram of a preferred embodiment of the current invention for controlling the flow of liquid chemicals or fertilizer onto a field.

FIG. 1 is a block diagram of a preferred embodiment of the current invention for controlling the flow of liquid chemicals and fertilizer onto a field. For the purpose of clarity, liquid chemicals and fertilizer will be referred to as fluid. The preferred embodiment is a pneumatic system, but the present invention will operate properly as either a hydraulic system, electric system, or a system including any combination of pneumatic, hydraulic, and electric components. A pneumatic system is preferred to an electric system because air supply lines and connections are more durable than electrical lines and connections. As is well known in the art, both compressed air and hydraulic fluid are common fluids for operating valve actuators. However, a pneumatic system is preferred to a hydraulic system in the present invention because pneumatic systems are less complex and expensive than hydraulic systems.

Referring now to FIG. 1, air supply 10 provides air to master switch 15. Master switch 15 is set to either open or close all of the nozzle valves 60, 65 and the main valve 35. If master switch 15 is set to "close", the air from air supply 10 is diverted to "close" manifold 20 and away from "open" manifold 25. Air will then flow from "close" manifold 20 to actuator 30 and operate to close main valve 35. Main valve 35 is closed by applying air to a first port of actuator 30. The air forces piston 95 into actuator 30. Piston 95 is attached to valve 35 so that when piston 95 retracts into actuator 30, valve 35 is closed. Actuators 50, 55 and respective nozzle valves 60, 65 operate in the same manner.

Air flowing from "close" manifold 20 will also flow to nozzle valve switches 40, 45. If nozzle valve switch 40 is set to "open", air will be directed to nozzle valve actuator 50 where the air will operate to force the piston into actuator 50, thus closing valve 60. If nozzle valve switch 40 is set to "close", the air will not pass to nozzle valve actuator 50. Thus, the position of valve 50 will remain unchanged. Switch 45 and associated actuator 55 and valve 65 operate in the same manner as switch 40 and associated actuator 50 and valve 60.

Additionally, if master switch 15 is set to "open", air from air supply 10 is diverted to "open" manifold 25 and away from "close" manifold 20. Air flowing from "open" manifold 25 to actuator 30 operates to open main valve 35. Main valve 35 is opened by applying air to a second port of actuator 30. The air forces piston 95 out of actuator 30. Piston 95 is attached to valve 35 so that when piston 95 extends from actuator 30, valve 35 is opened. Actuators 50, 55 and respective nozzle valves 60, 65 operate in the same manner.

When main valve 35 is open, fluid may flow from a supply tank (not shown) through piping 85 to nozzle valves 60, 65. Air flowing from "open" manifold 25 will also flow to nozzle valve switches 40, 45. If nozzle valve switch 40 is set to "open", air will be directed to nozzle valve actuator 50 where the air will operate to force the piston out of actuator 50, thus opening valve 60. When valve 60 is open, fluid in piping 85 may flow through nozzle valve 60 and nozzle 70 so that it is sprayed onto a ground surface or field. If nozzle valve switch 40 is set to "close", air will be directed to nozzle valve actuator 50 where the air will operate to force the piston into actuator 50, thus closing valve 60. Nozzle valve switch 45 and associated actuator 55, valve 65, and nozzle 75 operate in the same manner as nozzle valve switch 40 and associated actuator 50, valve 60, and nozzle 70.

In summary, setting master switch 15 to "close" will close each of the valves 35, 60, 65 which were open. Furthermore, setting master switch 15 to "open" will open the main valve 35 and each of the nozzle valves 60, 65 with a corresponding switch 40, 45 which is set to "open".

In a preferred embodiment, valves 35, 60, and 65 are ball valves, but may additionally be any type of valve which may be actuated. Ball valves are used because they have proven to be more leak resistant than other types of valves. Additionally, the actuators are separate from the valves. Since the valves and actuators are separate, fluid passing through the valves cannot corrode through the valves and into the actuator air supply lines 90. Furthermore, valves are used which, upon a loss of air pressure, either close (i.e., normally closed) or do not change their position (i.e., has no normal position). Valves which do not open upon a loss of air pressure are used, so that when the air leaks out of the pneumatic lines after the air compressor has been turned off (i.e., when the operator has finished spraying), the valves will not open and leak potentially hazardous material.

Additionally, in a preferred embodiment, switches 15, 40, and 45 are air diverting switches. Each switch diverts air from one port located on the switch to another port located on the same switch. Lines 90 represent air supply lines for directing the air supply between the switches 15, 40, 45; manifolds 20, 25; and actuators 30, 50, 55. Obviously, however, if actuators 30, 50, 55 are not air operated, switches 15, 40, 45 would not be air diverting switches, but instead switches appropriate to the type of operation used by actuators 30, 50, 55 or valves 35, 60, 65.

Figure 2:
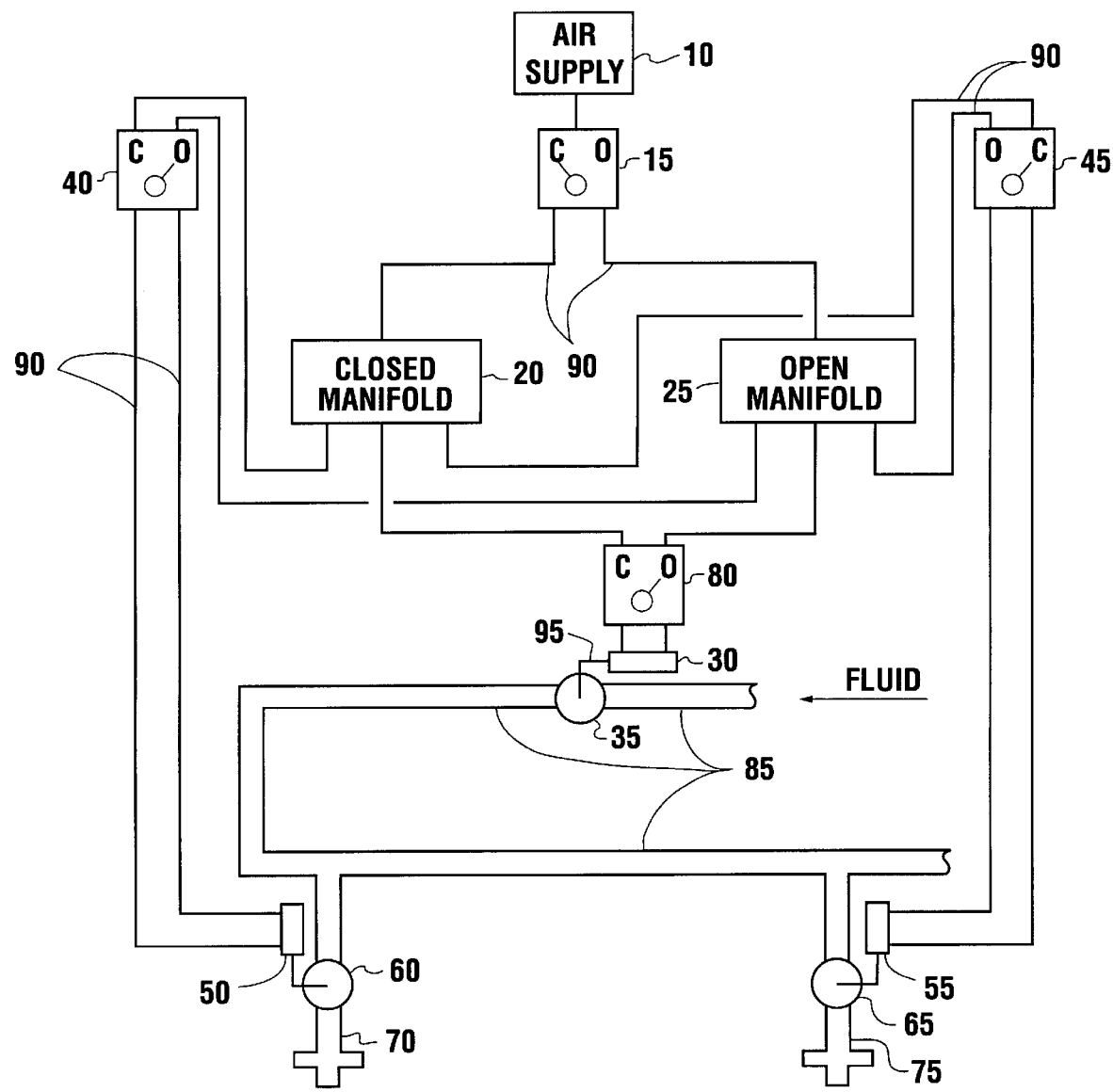
FIG. 2 is a block diagram of an alternate embodiment of the preferred invention shown in FIG. 1.

FIG. 2 represents an alternate embodiment of the present invention. Components in FIG. 2 which are similar to components in FIG. 1 are similarly numbered. In the alternate embodiment, main valve 35 is operated independently of nozzle valves 60, 65. However, main valve 35 and nozzle valves 60, 65 are closed essentially concurrently by setting master switch 15 to the "close" position, as described above in reference to FIG. 1. The independent operation of main valve 35 is accomplished by providing main valve switch 80 between manifolds 20, 25 and actuator 30. The switch 80 then operates to open and close main valve 35 in a manner similar to the manner switches 40, 45 operate to open and close nozzle valves 60, 65 respectively. This configuration allows main valve 35 to be closed while nozzle valves 60, 65 are opened. One purpose for opening nozzle valves 60, 65 while main valve 35 is closed is to drain piping 85.

For the purpose of clarity, only two nozzle valves are shown in FIGS. 1 and 2 and described above. However, the present invention incorporates systems which have more than two nozzle valves.

Figure 3:
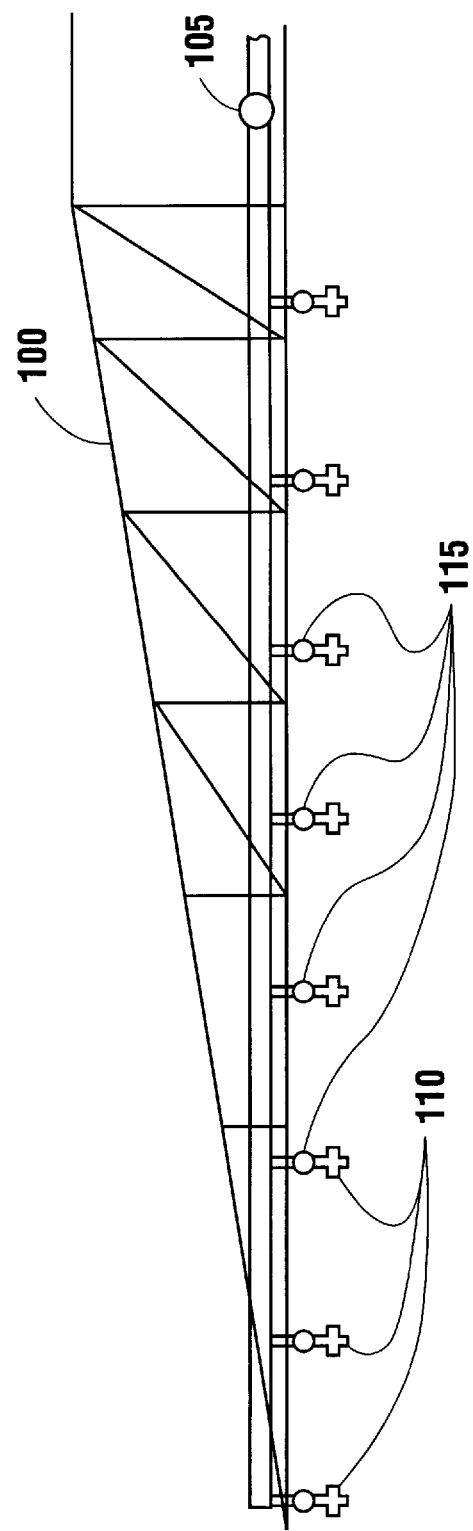
FIG. 3 depicts the present invention as incorporated onto a boom arm for spraying chemical or fertilizer onto a field.

FIG. 3 depicts the present invention as incorporated onto a boom arm 100 for spraying chemical or fertilizer onto a field or ground surface. Each boom arm 100 is provided with at least one main valve 105 which controls the flow of the fluid to the nozzles 110 on that boom arm 100. Each nozzle 110 is provided with an individual nozzle valve 115 which controls the flow of fluid to its corresponding nozzle 110.

Typically at least one boom is attached to a cab or trailer. Each boom typically has two boom arms 100, each boom arm 100 extending to opposite sides of the cab or trailer. Often, there are several booms attached to the cab or trailer. In particular, when using variable rate technology (VRT) in combination with a global positioning system (GPS), it is desirable to have multiple booms, each for spraying a different fluid. Optionally, each boom may include multiple spraying systems, each for spraying a different fluid. Each of the valves 105, 115 on the booms may be controlled by a central computer which uses the GPS and information about the requirements of the field at the particular location to determine which valves should be opened and which should be closed.

The present invention provides an improved means for implementing VRT because of the individually controlled nozzle valves 115 in connection with the main valve 105. Furthermore, the valves 105, 115 may be controlled by manually operated switches, or by computer operated switching means, for improved VRT capability. Importantly, however, is the fact that, through the switches the nozzle valves 115 are selectively, individually operated or synchronously operated in connection with the main valve 105.

Figure 4:
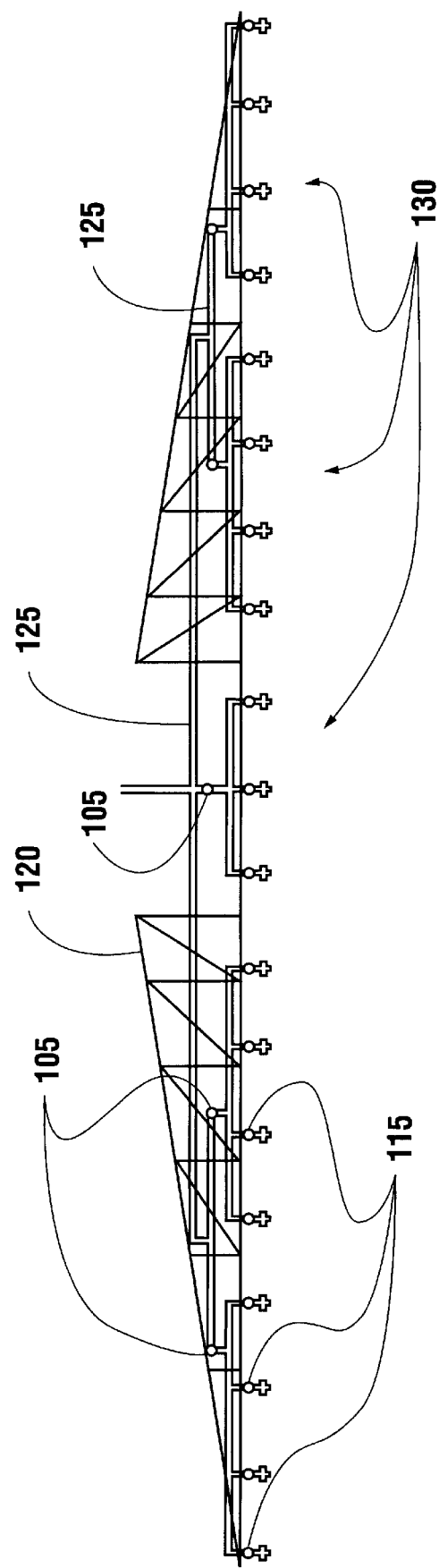
FIG. 4 depicts an alternate embodiment of the boom arm shown in FIG. 3.

FIG. 4 depicts a boom 120 showing an alternate configuration of main valves 105, nozzle valves 115, and piping 125. FIG. 4 shows multiple groups 130 of nozzle valves 115. Each group 130 is fed by piping 125 connected to a respective main valve 105. As is well known in the art, other configurations for mounting main valves and nozzles valves on a boom are possible.

In summary, what has been described above are the preferred embodiments for a system and method for applying liquid fertilizer and chemicals to a field using a master control which when closed, closes each nozzle valve, while allowing each nozzle valve to operate independently when the master control has not closed the nozzle valves. While the present invention has been described by reference to specific embodiments, it will be obvious that other alternative embodiments and methods of implementation or modification may be employed without departing from the true spirit and scope of the invention.

What is claimed is:

1. A system for applying fluid to a ground surface, the system comprising:
   (a) a main valve;
   (b) a plurality of nozzle valves;
   (c) first control means for operating each nozzle valve and the main valve
   (d) second control means for operating each nozzle valve so that each nozzle valve is, selectively, opened or closed independently of each other nozzle valve, provided the first control means has not closed the nozzle valves; and
   (e) piping means for directing the fluid, the piping means communicating with the main valve and each nozzle valve, wherein the fluid is directed first to the main valve, then, if the main valve is open, through the main valve, then to each of the nozzle valves, then through each nozzle valve which is open, wherein the first control means must operate to open the main valve for the second control means to selectively open each nozzle valve.

2. The system of claim 1 further including third control means for operating the main valve so that the main valve is, selectively, opened or closed independently of each nozzle valve while the first control means is operating to open the main valve and each nozzle valve.

3. The system of claim 1 further including:
   (a) a plurality of main valves;
   (b) a plurality of nozzle valves for each main valve;
   (c) the first control means further operating each main valve so that each main valve and each respective nozzle valve close essentially concurrently; and,
   (d) piping means for directing the fluid, the piping means communicating with each main valve and each respective nozzle valve, wherein the fluid is first directed to each main valve, then through each main valve which is open, then to each respective nozzle valve of each main valve which is open, then through each respective nozzle valve which is open.

4. The system of claim 3 further including at least one boom and wherein at least one of the main valves and the respective nozzle valves are mounted on the at least one boom.

5. The system of claim 1 further including at least one boom arm and wherein the nozzle valves are mounted on each boom arm.

6. The system of claim 1 further including the first control means further operating each nozzle valve so that each nozzle valve opens essentially concurrently, provided the second control means has operated to open each nozzle valve.

7. The system of claim 1 further including the first control means further operating each nozzle valve so that each nozzle valve, which the second control means has operated to open, opens essentially concurrently.

8. The system of claim 1 further including each nozzle valve having corresponding actuators and wherein each nozzle valve is operated by activating its corresponding actuator.

9. The system of claim 1 wherein each nozzle valve is, selectively, a ball valve, a plug valve, a gate valve, or a butterfly valve.

10. The system of claim 1 wherein each nozzle valve, selectively, is normally closed or has no normal position.

11. The system of claim 1 wherein each nozzle valve controls the flow of fluid to at least one nozzle.

12. A system for applying fluid to a field, the system comprising:
   (a) a main valve;
   (b) a plurality of nozzle valves;
   (c) first control means for operating the main valve and each nozzle valve so that the main valve and each nozzle valve close essentially concurrently;
   (d) second control means for operating each nozzle valve so that each nozzle valve is, selectively, opened or closed independently of each other nozzle valve, provided the first control means has not closed the nozzle valves; and,
   (e) piping means for directing the fluid, the piping means communicating with the main valve and each nozzle valve, wherein the fluid is directed first to the main valve, then, if the main valve is open, through the main valve, then to each of the nozzle valves, then through each nozzle valve which is open, wherein the first control means must operate to open the main valve for the second control means to selectively open each nozzle valve.

13. The system of claim 12 wherein each nozzle valve controls the flow of fluid to at least one nozzle.

14. A system for applying fluid to a ground surface, the system comprising:
   (a) a plurality of main valves;
   (b) a plurality of nozzle valves for each main valve;
   (c) at least one boom, wherein at least one of the main valves and the respective nozzle valves are mounted on the at least one boom;
   (d) first control means for operating each main valve and each nozzle valve so that each main valve and each respective nozzle valve close essentially concurrently;
   (e) second control means for operating each nozzle valve so that each nozzle valve is, selectively, opened or closed independently of each other nozzle valve, provided the first control means has not closed the nozzle valves; and,
   (f) piping means for directing the fluid, the piping means communicating with each main valve and each respective nozzle valve, wherein the fluid is first directed to each main valve, then through each main valve which is open, then to each respective nozzle valve of each main valve which is open, then through each respective nozzle valve which is open, wherein the first control means must operate to open the main valve for the second control means to selectively open each nozzle valve.

15. The system of claim 14 wherein each nozzle valve controls the flow of fluid to at least one nozzle.

16. A system for applying fluid to a ground surface, the system comprising:
   (a) a plurality of nozzle valves;
   (b) first control means having an actuating fluid for operating each nozzle valve so that each nozzle valve closes essentially concurrently, said first control means including:
      (i) first and second manifolds;

(ii) first switching means for directing the actuating fluid, selectively, to the first manifold or to the second manifold;

(c) second control means having an actuating fluid for operating each nozzle valve so that each nozzle valve is, selectively, opened or closed independently of each other nozzle valve, provided the first control means has not closed the nozzle valves; and, (d) first tubing means for directing the actuating fluid between the first switching means, the second control means, the first manifold, and the second manifold, the first tubing means communicating with the first switching means, the second control means, the first manifold, and the second manifold, wherein the actuating fluid is first directed to the first switching means, the first switching means selectively directs the actuating fluid to the first manifold or the second manifold, the first and second manifold then each direct the actuating fluid to the second control means.

17. The system of claim 16 wherein the actuating fluid is, selectively, compressed air or hydraulic fluid.

18. The system of claim 16 wherein each nozzle valve controls the flow of fluid to at least one nozzle.

19. The system of claim 16 further including at least one boom and wherein the nozzle valves are mounted on the at least one boom.

20. The system of claim 16 further including third control means for operating the main valve so that the main valve is, selectively, opened or closed independently of each nozzle valve.

21. A system for applying fluid to a ground surface, the system comprising:

(a) a plurality of nozzle valves;

(b) first control means having an actuating fluid for operating each nozzle valve so that each nozzle valve closes essentially concurrently; and, (c) second control means having an actuating fluid for operating each nozzle valve so that each nozzle valve is, selectively, opened or closed independently of each other nozzle valve, provided the first control means has not closed the nozzle valves the second controls means further including:

(i) a plurality of second switching means, each second switching means for directing the actuating fluid to one of the nozzle valves in order to, selectively, open or close the corresponding nozzle valve; and, (ii) second tubing means for directing the actuating fluid between each second switching means and the corresponding nozzle valve of each second switching means, the second tubing means communicating with the first control means, each second switching means, and each nozzle valve, wherein the actuating fluid is first directed from the first control means to each second switching means, each second switching means then directs the actuating fluid to operate the corresponding nozzle valve of each second switching means to, selectively, open or close the corresponding nozzle valve of each second switching means.

22. The system of claim 21 wherein each nozzle valve controls the flow of fluid to at least one nozzle.

23. The system of claim 21 further including at least one boom and wherein the nozzle valves are mounted on each boom arm.

24. The system of claim 21 further including third control means for operating the main valve so that the main valve is, selectively, opened or closed independently of each nozzle valve.

* * * * *